(12) United States Patent
Park et al.

(10) Patent No.: US 9,577,295 B2
(45) Date of Patent: Feb. 21, 2017

(54) BATTERY SYSTEM AND TEMPERATURE CONTROLLING UNIT THEREOF

(71) Applicant: Hyundai Motor Company, Seoul (KR)

(72) Inventors: Jae Woo Park, Ansan-si (KR); Jae Woong Kim, Hwaseong-si (KR); Man Ju Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 14/526,122

(22) Filed: Oct. 28, 2014

(65) Prior Publication Data
US 2015/0380780 A1    Dec. 31, 2015

(30) Foreign Application Priority Data
Jun. 30, 2014  (KR) .................. 10-2014-0080658

(51) Int. Cl.
| | |
|---|---|
| *H01M 10/613* | (2014.01) |
| *H01M 10/625* | (2014.01) |
| *H01M 10/6556* | (2014.01) |
| *H01M 10/6552* | (2014.01) |
| *H01M 10/6555* | (2014.01) |

(52) U.S. Cl.
CPC ......... *H01M 10/613* (2015.04); *H01M 10/625* (2015.04); *H01M 10/6552* (2015.04); *H01M 10/6555* (2015.04); *H01M 10/6556* (2015.04); *H01M 2220/20* (2013.01)

(58) Field of Classification Search
CPC .. H01M 10/60; H01M 10/613; H01M 10/617; H01M 10/625; H01M 10/6552; H01M 10/6555; H01M 10/6556; H01M 2220/20
See application file for complete search history.

(56) References Cited

U.S. PATENT DOCUMENTS

| | | | |
|---|---|---|---|
| 6,394,175 B1* | 5/2002 | Chen ................. | H01L 23/427 165/104.33 |
| 2009/0087727 A1* | 4/2009 | Harada ............... | H01M 2/1077 429/120 |
| 2014/0318746 A1* | 10/2014 | Kwak ............... | H01M 10/5004 165/104.33 |

FOREIGN PATENT DOCUMENTS

| | | |
|---|---|---|
| JP | 2009-9889 A | 1/2009 |
| JP | 2012-033486 A | 2/2012 |
| JP | 2012-138315 A | 7/2012 |
| JP | 2013-89566 A | 5/2013 |

(Continued)

*Primary Examiner* — Carlos Barcena
(74) *Attorney, Agent, or Firm* — Morgan, Lewis & Bockius LLP

(57) ABSTRACT

A battery system may include a plurality of unit batteries each having a panel shape and stacked in series. The system may also include a plurality of heat conduction plates each having a panel shape and inserted between the unit batteries such that a first part of each respective heat conduction plate is inserted between opposing faces of corresponding unit batteries, with upper and lower faces of each respective heat conduction plate being in contact with the opposing faces of the corresponding unit batteries, and a second part of each respective heat conduction plate is exposed to an outside of the stacked unit batteries. The system may further include at least one heat pipe thermally coupling the plurality of heat conduction plates by successively penetrating the exposed second parts of the heat conduction plates, with an end of the heat pipe being thermally coupled to a heat radiator after penetrating a last heat conduction plate.

14 Claims, 4 Drawing Sheets

(56) References Cited

FOREIGN PATENT DOCUMENTS

| JP | 2013-541133 A | 11/2013 |
|----|---------------|---------|
| KR | 10-2013-0113737 A | 10/2013 |

* cited by examiner

BATTERY SYSTEM AND TEMPERATURE CONTROLLING UNIT THEREOF

CROSS-REFERENCE TO RELATED APPLICATION

The present application claims priority of Korean Patent Application Number 10-2014-0080658 filed on Jun. 30, 2014, the entire contents of which application are incorporated herein for all purposes by this reference.

BACKGROUND OF INVENTION

Field of Invention

The present invention relates to a high voltage battery for vehicles with improved cooling efficiency and, more specifically, to a battery system and a temperature controlling unit that reduces the number or size of battery packages, and remedy situation of a unit battery not providing required power to an electric vehicle due to high temperature or situation of the battery being exposed to temperature which may significantly impair the durability of the battery.

Description of Related Art

A battery is made of a module which is formed by stacking a plurality of thin plate cells, and a plurality of modules is connected together in series to form a battery package. In the battery pack, heat is produced during charging and discharging by a chemical reaction, and the charging and discharging capacity of the battery varies with the temperature of the cells. Thus, it is required to maintain the cell temperature within an appropriate range such that the inner temperature of the battery is maintained at predetermined temperatures, for example, 25 to 40 degrees, during operation.

Therefore, a system for removing heat generated from a high-voltage battery is indispensible for an electric-powered vehicle using such a battery. The cooling system of the electric-powered vehicle is classified into water-cooling and air-cooling systems, in which the air-cooling system is preferred in most cases, as the water-cooling system has drawbacks of a complicated structure and high cost in spite of good cooling efficiency.

In the air-cooling system, cooling efficiency varies with the structure of a cooling path, and the uniform distribution of cooling air is particularly important when the number of modules is increased for realizing an increase in the capacity of battery.

The most important factor when cooling the battery of an electric-powered vehicle will be the highest temperature of the battery and a temperature difference between unit battery cells. The highest temperature of the battery may be efficiently controlled by adjusting the amount of cooling air, and the temperature of inlet air. Although the temperature difference between battery cells may be reduced by improving the structure of the duct system to some extent, the temperature difference inevitably occurs between battery cells.

Although in an ideal case a reduction in the temperature difference between battery cells may be achieved by providing the same amount of cooling air to each cooling path between each unit cell, this solution cannot be realized in a real system. Thus, in actual systems, merely attempting to provide a uniform amount of cooling air to each cooling path is all that is possible, but such an approach has limitations.

Disregarding insignificant structural differences, most conventional cooling systems arrange battery cells linearly, and provide cooling air from a sirocco fan by using a duct system. Characteristics of the sirocco fan and duct system accordingly restrict the uniform distribution of cooling air. As a result, the uniform cooling of each battery cell is not achieved, thereby causing a temperature deviation between battery cells, e.g. 5° C., so a desired battery capability through the optimization of cell temperature cannot be secured.

An environmentally friendly vehicle equipped with a high-voltage battery should have a system for cooling the battery, and control the cooling system to prevent the battery from reaching an overheated state.

Conventional cooling of the high-voltage battery is achieved by drawing the interior air of the vehicle into the battery, and blowing this air into the space between each cell of the battery. As the above described system compulsorily blows air between cells, each flow path has a different flow resistance which deteriorates uniform cooling and makes flow noise. Additionally, the accumulation of foreign substances over time, such as dust, may cause serious problems.

If the cooling of the high-voltage battery is not sufficient, the battery may be overheated leading to deterioration of the battery, and in severe cases, may cause a safety problem such as a battery explosion. When the battery is charged or discharged, evaporation gas is generated in the electrolyte of the battery by electro-chemical reaction, and this gas may enter into the passenger compartment of the vehicle to cause a problem of air pollution in the compartment. Though, until now, there have been no restrictions regulating the interior air of the vehicle, an appropriate countermeasure is needed in anticipation of predicted legislation that will require regulating the interior air of electric vehicles.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention intended to provide a battery system and a temperature controlling unit thereof, which can solve the battery's reduced capability to supply sufficient power necessary for an electric vehicle when the battery is in a high temperature situation or is exposed to a temperature in which battery's durability may be significantly deteriorated.

According to one aspect of the present invention, there is provided a battery system, including: a plurality of unit batteries each having a panel shape and stacked in series with opposing faces of adjacent unit batteries being close to each other; a plurality of heat conduction plates each having a panel shape and made of a conductive material, and inserted between the unit batteries in a manner such that a first part of each respective heat conduction plate is inserted between opposing faces of corresponding unit batteries, with upper and lower faces of each respective heat conduction plate being in contact with the opposing faces of the corresponding unit batteries, and a second part of each respective heat conduction plate is exposed to an outside of the stacked unit batteries; and at least one heat pipe thermally coupling the plurality of heat conduction plates by successively penetrating the exposed second parts of the heat conduction plates at the outside of the unit batteries, with an end of the heat pipe being thermally coupled to a heat radiator after penetrating a last heat conduction plate.

The plurality of unit batteries and the heat conduction plates may be stacked substantially vertically, and the at least one heat pipe may penetrate the heat conduction plates substantially vertically. The at least one heat pipe may penetrate the heat conduction plates substantially in a direction of gravity. The at least one heat pipe may include a plurality of heat pipes that are spaced apart from each other and arranged substantially in parallel to penetrate the exposed second parts of the heat conduction plates.

The heat conduction plates may include a first set of plates and a second set of plates that are inserted into the unit batteries from opposite sides of the unit batteries. The plurality of heat conduction plates may include: a first set of plates and a second set of plates, the first and second sets of plates being separated from each other, in which inserted parts of the first set of plates may be inserted into the unit batteries from a first side of the unit batteries, and inserted parts of the second set of plates may be inserted into the unit batteries from a second side of the unit batteries, and the at least one heat pipe may penetrate exposed parts of the first and second sets of plates.

A length of each of the heat conduction plates may be shorter than half of a length of each of the unit batteries.

The first and second sets of heat conduction plates may be inserted between the unit batteries at the same level so as to be arranged in a manner such that ends of the first and second sets of heat conduction plates face each other in an inserted status between the unit batteries. The unit batteries and the heat conduction plates may be stacked substantially vertically, and the heat pipe may penetrate the heat conduction plates substantially vertically.

The at least one heat pipe may include: a first set of heat pipes penetrating the first set of heat conduction plates and a second set of heat pipes penetrating the second set of heat conduction plates, each set of heat pipes being bent at or above an upper part of the stacked unit batteries in a direction toward a center of the unit batteries, and each end of the first and second sets of bent heat pipes being coupled to a heat radiator.

The at least one heat pipe may include: a first set of heat pipes penetrating the first set of heat conduction plates and a second set of heat pipes penetrating the second set of heat conduction plates, each set of heat pipes extending upwardly over the stacked unit batteries, and each end of the first and second sets of heat pipes being coupled to a heat radiator.

In another aspect of the present invention, there is provided a battery system, including: a plurality of unit batteries each having a panel shape and stacked in series with opposing faces of adjacent unit batteries being close to each other; a plurality of heat conduction plates inserted between the unit batteries in a manner such that a first part of each respective heat conduction plate is inserted between opposing faces of corresponding unit batteries, with upper and lower faces of each respective heat conduction plate being in contact with the opposing faces of the corresponding unit batteries, and that a second part of each respective heat conduction plate is exposed to an outside of the stacked unit batteries; a heat pipe thermally coupling the plurality of heat conduction plates by successively penetrating the exposed second part of the heat conduction plates at the outside of the unit batteries, with an end of the heat pipe being thermally coupled to a heat radiator after penetrating a last heat conduction plate; a housing hermetically surrounding the unit batteries, the heat conduction plates and the heat pipe; and an air duct surrounding the heat radiator.

In a further aspect of the present invention, there is provided a battery system, including: a plurality of unit batteries each having a panel shape and stacked in series with opposing faces of adjacent unit batteries being close to each other; a plurality of heat conduction plates each having a panel shape and made of a conductive material, and inserted between the unit batteries in a manner such that first parts of the heat conduction plates are inserted between the opposing faces of the unit batteries, with upper and lower faces of the heat conduction plates being in contact with the opposing faces of the unit batteries, and that second parts of the heat conduction plates are exposed to an outside of the stacked unit batteries; a heat pipe thermally coupling the plurality of heat conduction plates by successively penetrating the exposed second parts of the heat conduction plates at the outside of the unit batteries, with an end of the heat pipe being thermally coupled to a heat radiator after penetrating a last heat conduction plate; and an air duct surrounding the heat radiator. The end of the heat pipe may be inserted into the air duct after penetrating the last heat conduction plate so as to be coupled to the heat radiator inside the air duct.

In a still another aspect, there is provided a temperature controlling unit of a battery system, the temperature controlling unit including: a plurality of heat conduction plates each having a panel shape and made of conductive material, and inserted between a plurality of unit batteries in a manner such that first parts of the heat conduction plates are inserted between opposing faces of the stacked unit batteries, with upper and lower faces of each respective heat conduction plate being in contact with the opposing faces of corresponding adjacent unit batteries, and that second parts of the heat conduction plates are exposed to an outside of the unit batteries; and a heat pipe thermally coupling the plurality of heat conduction plates by successively penetrating the exposed second parts of the heat conduction plates at the outside of the unit batteries, with an end of the heat pipe being thermally coupled to a heat radiator after penetrating a last heat conduction plate. The plurality of heat conduction plates may be arranged substantially in parallel and may be spaced apart from each other by a thickness of each of the unit batteries.

In the battery system and temperature controlling unit according to the present invention, by placing heat conduction plates between battery cells or unit batteries while eliminating the air path between each cells to reduce the space of the air path, the overall size of the battery module is accordingly dramatically reduced, and the resultant low flow resistance due to the simple air path in the cooling part produces less noise and dramatically reduces blower fan capacity required for the same amount of air flow as in a conventional system.

The heat pipes placed at ends of each heat conduction plate can conduct heat by using the phase transition of working fluid contained therein and exhibit a much faster heat transfer rate than general metal by hundreds times, thereby efficiently reducing the temperature difference between battery cells and efficiently dissipating heat.

Moreover, the heat conductive structure using the heat pipes enables the realization of a division of the tightly restricted space of a vehicle into a battery cell part and a cooling part, thereby accomplishing a compact battery and increasing a degree of design freedom by realizing an effective cooling system, e. g. the cooling part can be placed on the upper part or side of the battery cells.

According to the present invention, a closed-type battery system can be achieved, in which the introduction of foreign substances and moisture by the circulation of cooling air through the intake/outlet is thoroughly blocked to thus prevent safety accidents. The present invention maximizes energy efficiency of an environmentally friendly vehicle and minimizes the temperature difference between battery cells by efficiently cooling the battery, reduces claim costs by enhancing the battery durability, and improves the product value of the battery as mileage is enhanced through efficient management of electric energy.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
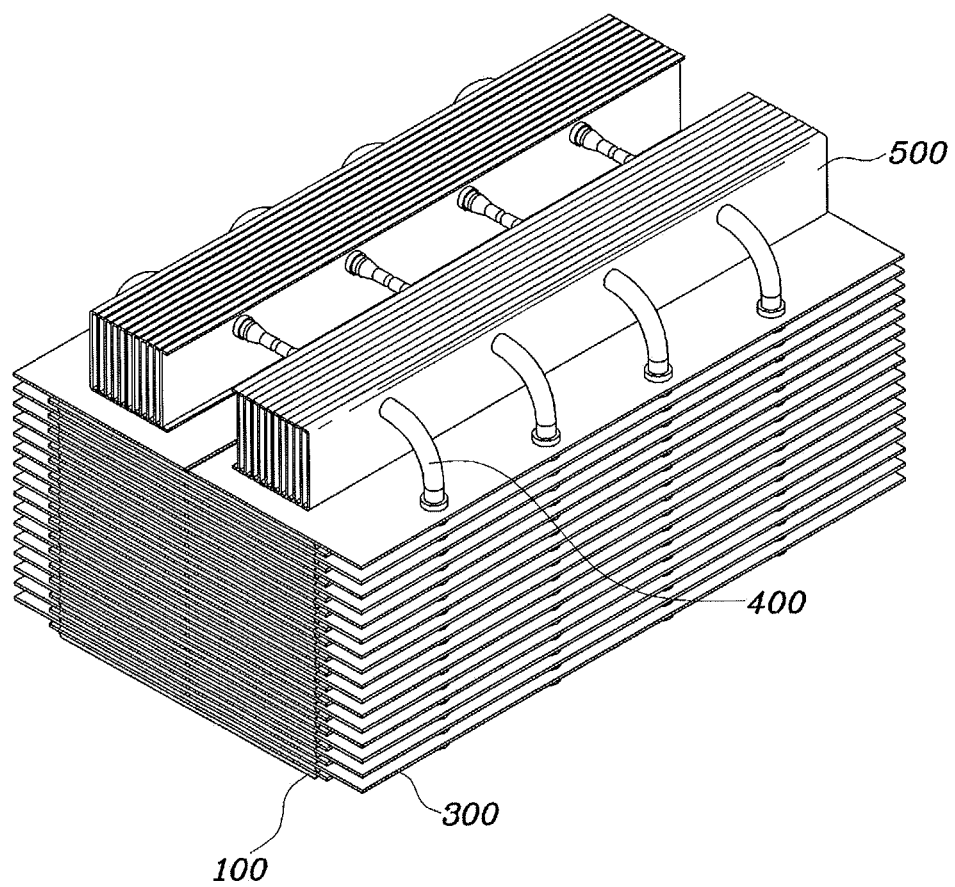
FIG. 1 and FIG. 2 are a perspective view and a front view illustrating an exemplary battery system and a temperature controlling unit of the battery system according to the present invention.
Figure 2:
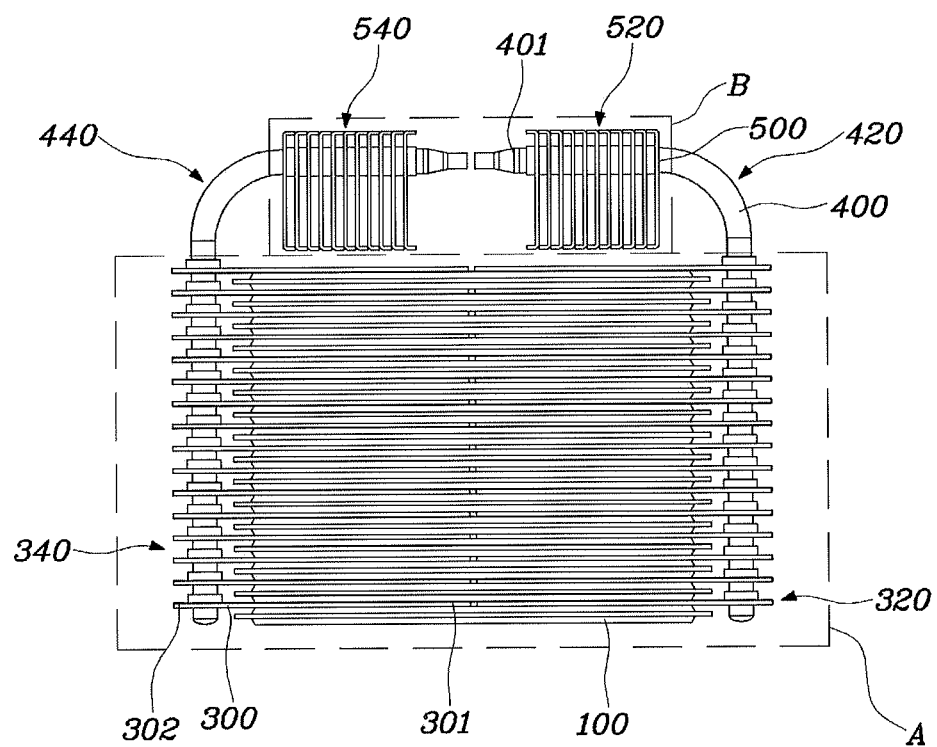
Figure 3:
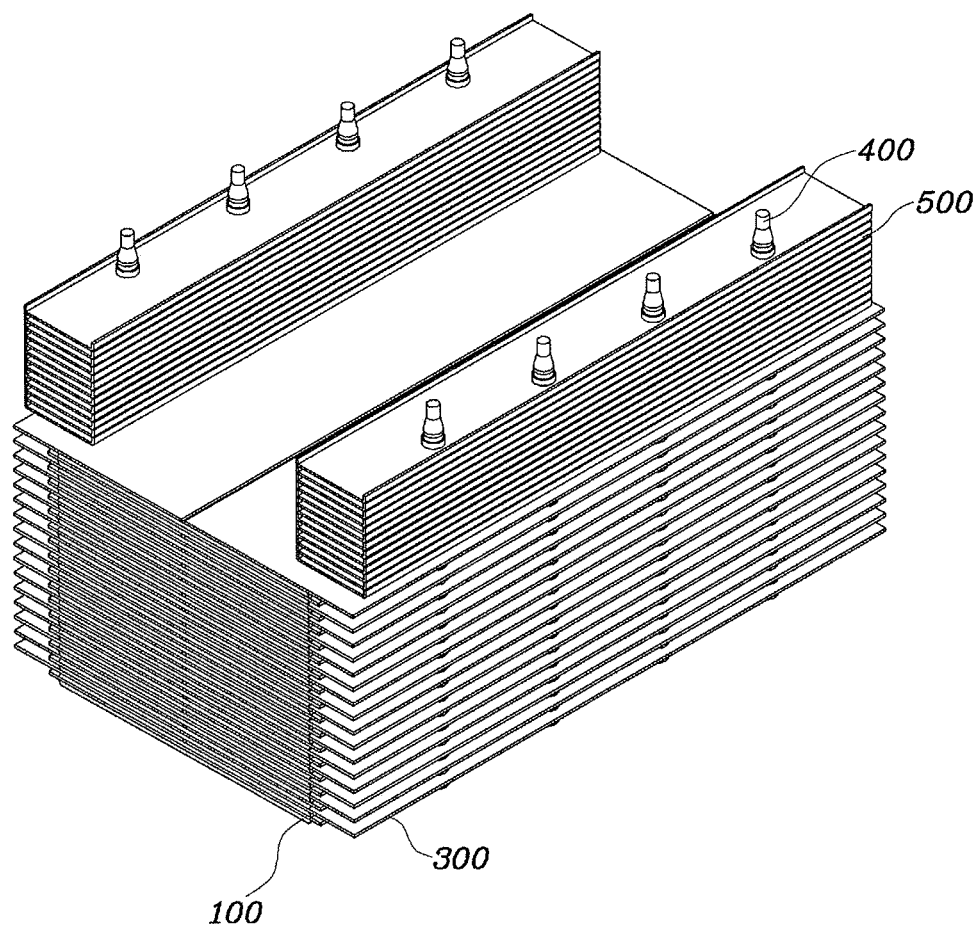
FIG. 3 and FIG. 4 are a perspective view and a front view illustrating another exemplary battery system and a temperature controlling unit of the battery system according to the present invention.
Figure 4:
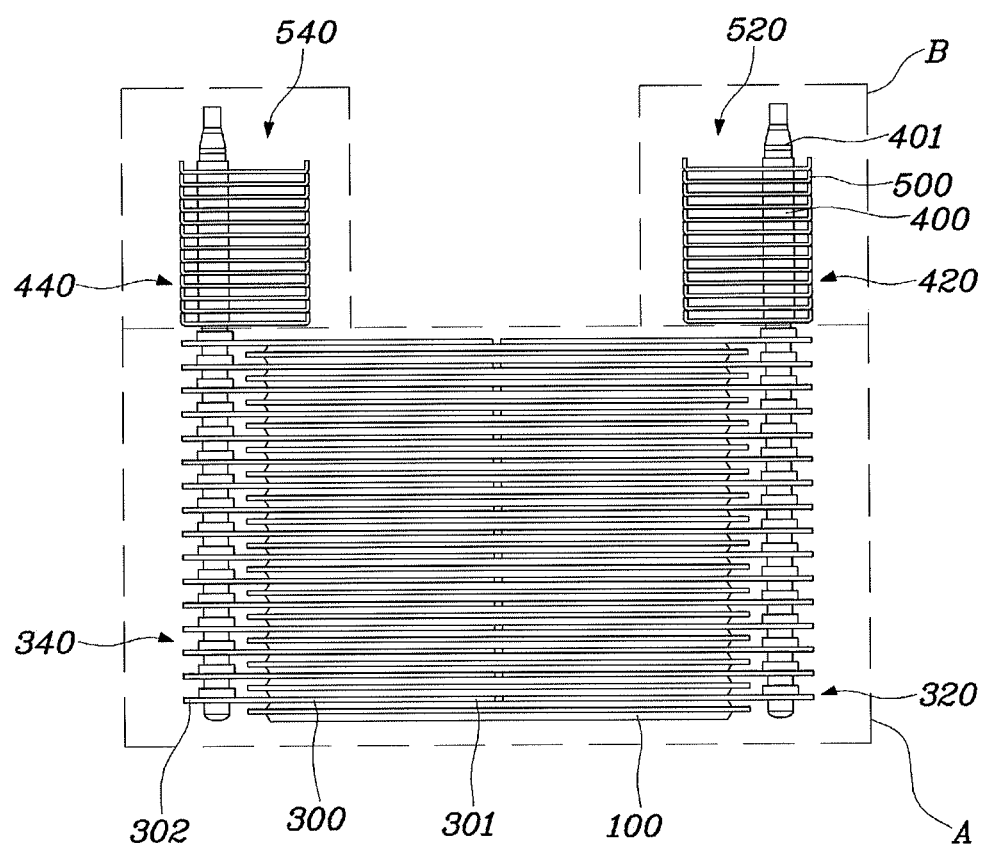

FIGS. 1 and 2 depict a battery system and a temperature controlling unit of the battery system according to an embodiment of the present invention; and FIGS. 3 and 4 depict a battery system and a temperature controlling unit of the battery system according to another embodiment of the present invention.

As shown in FIGS. 1 and 2, the battery system according the present invention, includes: a plurality of unit batteries 100, each of which has a panel shape, is stacked in series, and in which opposing faces of adjacent unit batteries are close; a plurality of heat conduction plates 300 made of a heat conductive material and inserted between the unit batteries 100, respectively, in such a manner that a first part 301 of each plate 300 is inserted between opposing faces of the unit batteries 100 such that upper and lower faces of the first part 301 are in contact with the opposing faces of the unit batteries 100, and a second part 302 of each plate 300 is exposed to the outside of the stacked unit batteries 100; and a heat pipe 400 thermally coupling the plurality of heat conduction plates 300 by successively penetrating the second parts 302 of the heat conduction plates 300 at locations outside the stacked unit batteries 100, with an end of the heat pipe 400 being thermally coupled to a heat radiator 500 after penetrating a last heat conduction plate 300.

The unit battery 100 may be a battery cell or a module of pouch type, and the unit batteries 100 are stacked as shown, and connected in series to form a high-voltage battery. The unit batteries 100 have a panel shape and are serially stacked in a manner that opposing faces are closely adjacent with each other. Thus, no air flow channel between the unit batteries 100 remains, thereby drastically reducing the size of the battery package and realizing an improvement in the structure of the battery package.

Each of the heat conduction plates 300 also has a panel shape, and is made of a heat conductive material. The first parts 301 of the heat conduction plates 300 are inserted between contact faces of the unit batteries 100, respectively, such that the upper and lower faces of each first part 301 are in contact with opposing faces of associated unit batteries 100, and the second parts 302 of the heat conduction plates 300 are exposed outside of the stacked unit batteries 100. Local heat of the unit batteries 100 is accordingly conducted to the whole area of the heat conduction plates 300, thereby facilitating the temperature of the unit batteries 100 being kept uniform.

The heat conduction plate 300 may be provided in plural, and each of the heat conduction plate 300 is inserted between adjacent unit batteries 100.

The heat pipe 400 thermally couples the plurality of heat conduction plates 300 by successively penetrating the exposed second parts 302 of the heat conduction plates 300. Thus, the plurality of heat conduction plates 300 and the unit batteries 100 are thermally coupled together to form a single heat mass. This prevents the local overheating of the batteries and enhances durability of the batteries by lowering the thermal deterioration of the batteries. The end 401 of the heat pipe 400 is thermally coupled to the heat radiator 500 after penetrating the last heat conduction plate 300. This enables the battery system to be formed in a closed manner, thereby allowing efficient heat control, and blocking the inflow of dust and the emission of environmental contaminants. The heat radiator 500, being formed in a fin-shape or a mass, cools or heats the closed battery system from outside by being connected to a heat exchanger like a Peltier element, or by circulation of air by a blower.

The plurality of unit batteries 100 and the heat conduction plates 300 may be stacked vertically or substantially vertically, and the heat pipe 400 may vertically or substantially vertically penetrate the heat conduction plates 300. In other words, the heat pipe 400 may penetrate the heat conduction plates 300 in the direction of gravity. As the heat pipe 400 utilizes the vaporization of a minimum amount of water contained therein, vertical arrangement of the heat pipe 400 in the direction of gravity enables heat to be dissipated upwardly to exhibit better cooling of battery.

The heat pipe 400 may be embodied in a plural number and multiple heat pipes 400 may penetrate the exposed second parts 302 of the heat conduction plates 300 being spaced in parallel or substantially in parallel. A plurality of heat pipes 400, being arranged vertically or substantially vertically, is coupled to the same conduction plates 300, thereby accomplishing the thermal equilibrium of the battery system as a whole.

The heat conduction plates 300 may be inserted to the unit batteries 100 from opposite sides of the batteries 100. This enables cooling of the batteries from opposite sides, and facilitates easy assembly of the battery system as the plates 300 are inserted to the unit batteries from the opposite sides. In contrast with this, the heat conduction plates 300 may be alternately inserted from the opposite sides of the unit batteries 100, to enable the overall cooling from the opposite sides.

More specifically, those multiple heat conduction plates 300 may constitute a first set 320 and a second set 340, being separated from each other, in which a first part of the first set 320 is inserted into the unit batteries 100 from a first side, while a first part of the second set 340 is inserted into the unit batteries 100 from a second side, and the heat pipes 420, 440 respectively penetrate the second parts of the two sets 320, 340. To keep the structural conformity of the battery system, lengths of the first and second heat conduction plate sets 320, 340 may be shorter than half of that of the unit batteries 100.

The first and second heat conduction plate sets 320, 340 may be inserted between the unit batteries 100 at the same level such that the ends of the plate sets face each other. The plurality of unit batteries 100 and the heat conduction plates 300 may be stacked vertically or substantially vertically, and the heat pipes 420, 440 may penetrate heat conduction plates vertically or substantially vertically, thus dissipating heat upwardly.

More specifically, the heat pipes 400 comprise a first set of heat pipes 420 penetrating the first set of heat conduction plates 320, and a second set of heat pipes 440 penetrating the second set of heat conduction plates 340. Here, at positions above the stacked unit batteries 100, upper ends of the heat pipes 420, 440 of the two sets are respectively bent toward the center of the unit batteries 100, and heat radiators 520, 540 may be coupled to bent ends 401 of the heat pipes 420, 440 of the first and second sets, respectively. Thus, the cooling of the batteries 100 can be performed at the upper part of batteries and the size of the battery package can be reduced to eliminate empty space.

Referring to FIGS. 3 and 4, the heat pipes may comprise a first set of heat pipes 420 penetrating the first set of heat conduction plates 320 and a second set of heat pipes 440 penetrating the second set of heat conduction plates 340. Upper ends of the two sets of heat pipes 420, 440 extend upwardly over the stacked unit batteries 100, and heat radiators 520, 540 may be coupled to the upper ends 401 of the two sets of heat pipes 420, 440, respectively. This embodiment requires no bending of the heat pipes and reveals better heat dissipating efficiency as the heat pipes are maintained as straight pipes.

A battery system according to another embodiment of the present invention, includes: a plurality of unit batteries 100, which have a panel shape, and are stacked in series, with opposing faces of adjacent unit batteries being close to each other; a plurality of heat conduction plates 300, which have a panel shape and are made of a conductive material, and are inserted between the unit batteries 100, respectively, in a manner that a first part 301 of each plate 300 is inserted between contacting faces of the unit batteries 100 such that upper and lower faces of the plate 300 are in contact with the opposing faces of the unit batteries 100, and that a second part 302 of each plate 300 is exposed to the outside of the stacked unit batteries 100; a heat pipe 400 thermally coupling the plurality of heat conduction plates 300 by successively penetrating the exposed parts of heat conduction plates 300 at the outside of the unit batteries 100, with an end 401 of the heat pipe 400 being thermally coupled to a heat radiator 500 after penetrating a last heat conduction plate 300; a housing A hermetically surrounding the unit batteries 100, the heat conduction plates 300 and the heat pipe 400; and an air duct B surrounding the heat radiator 500. Thus, the batteries are hermetically covered with the housing A to facilitate cooling performance and to block or almost completely block the introduction of environmental contaminants such as dust into the battery system. Further, the end 401 of the heat pipe is inserted into the air duct B, after penetrating the last of heat conduction plates 300, and is coupled to the heat radiator 500 in the inner space of the air duct B. The heat radiator 500 may discharge heat to the outside via the air duct B.

A battery system according to a further embodiment of the present invention, includes: a plurality of unit batteries 100, which have a panel shape, and are stacked in series, with opposing faces of adjacent unit batteries being close to each other; a plurality of heat conduction plates 300, which have a panel shape and are made of a conductive material, the heat conduction plates 300 being inserted between the unit batteries 100 respectively, in a manner that a first part 301 of each plate 300 is inserted between the closely adjacent faces of the unit batteries 100 such that upper and lower faces of the plate 300 are in contact with opposing faces of the unit batteries 100, and that a second end 302 of each plate 300 is exposed to the outside of the stacked unit batteries 100; a heat pipe 400 thermally coupling the plurality of heat conduction plates 300 by successively penetrating the exposed parts of the heat conduction plates 300 at the outside of the unit batteries 100, with an end 401 of the heat pipe 400 being thermally coupled to a heat radiator 500 after penetrating a last heat conduction plate 300; and an air duct B surrounding the heat radiator 500.

A temperature controlling unit of or for a battery system according to the present invention, includes: a plurality of heat conduction plates 300, which have a panel shape and are made of a conductive material, inserted between a plurality of unit batteries 100 in a manner that first parts 301 of the heat conduction plates are inserted between closely adjacent faces of the stacked unit batteries 100 such that the upper and lower faces of the heat conduction plates are in contact with the opposing faces of adjacent unit batteries 100, and that second parts 302 of the heat conduction plates 300 are exposed to the outside of the unit batteries 100; and a heat pipe 400 thermally coupling the plurality of heat conduction plates 300 by successively penetrating the exposed parts 302 of the heat conduction plates 300 at the outside of the unit batteries 100, with the end 401 of the heat pipe 400 being thermally coupled to a heat radiator 500 after penetrating a last heat conduction plate 300. The plurality of heat conduction plates are arranged in parallel or substantially in parallel, and may be spaced apart from each other by the thickness of each of the unit batteries 100, thereby facilitating easy insertion of the heat conduction plates 300 in assembly.

As a conventional cooling system for batteries directly blows interior air of a vehicle into the gaps between battery cells housed in respective metal cases, a temperature deviation of the battery occurs depending on the flow rate and temperature of the air. Further, evaporation gas produce by chemical reaction of the battery may enter into the interior of the vehicle, which may result in claims by a consumer over the contamination of interior air. Consequently, needs for an air flow channel in each of battery cells, which increases the size of the battery, and the need direct blowing of cooling air into the gaps between the battery cells, which causes introduction of dust, foreign substance, moisture to the interior of the battery to cause severe problems, e. g. explosion by short circuit are no longer required.

On the contrary, the cooling system for batteries according to the present invention adopts an indirect cooling system, in which heat is conductively transferred to the outside by coupling a heat pipe to ends of the heat conduction plates. By the conduction of heat conduction plates as described above, a temperature deviation between positions of the battery is measured below 3° C. Further, the battery is hermetically closed, so the interior of the battery can avoid contact with interior air of the vehicle. The volume of the battery can be reduced by about 30%, because a conventional air flow channel formed between the cells is eliminated. Further, the heat radiator is separated from the battery to reduce the flow resistance on cooling fins, thereby achieving low noise and much smaller fan capacity for the same flow rate.

Therefore, in the battery system and temperature controlling unit according to the present invention, the heat conduction plates are inserted between battery cells while eliminating an air flow path from between the cells, as described above, thereby drastically reducing the overall size of a battery module as much as the volume of the conventional air flow path. This makes a simple air flow path that can achieve low noise, and requires much smaller blower fan capacity for the same flow rate.

The heat pipes placed at ends of the heat conduction plates conduct heat by using phase transition of a working fluid contained therein to exhibit much faster heat transfer rate than general metals by hundreds times, so the heat pipes can reduce the temperature difference between battery cells and can efficiently dissipate heat. Moreover, the heat conductive structure using the heat pipes enables dividing the battery cell part and the cooling part in a tightly restricted space of a vehicle, thereby accomplishing a compact battery and increasing the degree of design freedom by using an effective cooling system, and allowing the cooling part to be placed on an upper part or a side part of the battery cells.

According to the present invention, a closed-type battery system can be achieved, in which the introduction of foreign substances and moisture by the circulation of cooling air via intake/outlet is almost completely blocked, thereby preventing safety accidents. The present invention also maximizes energy efficiency of an environmentally friendly vehicle and minimizes the temperature deviation between battery cells by an efficient battery cooling, and reduces claim costs of batteries by enhancing battery durability, and improves the product value of the battery as mileage is enhanced through efficient management of electric energy.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery system, comprising:
   a plurality of unit batteries each having a panel shape and stacked in series with opposing faces of adjacent unit batteries being next to each other;
   a plurality of heat conduction plates each having a panel shape and made of a conductive material, and inserted between the unit batteries in a manner such that a first part of each respective heat conduction plate is inserted between opposing faces of corresponding unit batteries, with upper and lower faces of each respective heat conduction plate being in contact with the opposing faces of the corresponding unit batteries, and a second part of each respective heat conduction plate is exposed to an outside of the stacked unit batteries; and
   at least one heat pipe thermally coupling the plurality of heat conduction plates by successively penetrating the exposed second parts of the heat conduction plates at the outside of the unit batteries, with an end of the heat pipe being thermally coupled to a heat radiator after penetrating a last heat conduction plate,
   wherein the plurality of heat conduction plates comprise a first set of plates and a second set of plates, the first and second sets of plates being separated from each other, in which inserted parts of the first set of plates are inserted into the unit batteries from a first side of the unit batteries, and inserted parts of the second set of plates are inserted into the unit batteries from a second side of the unit batteries, and the at least one heat pipe penetrates exposed parts of the first and second sets of plates, and
   wherein the first and second sets of heat conduction plates are inserted between the unit batteries at a same level so as to be arranged in a manner such that ends of the first and second sets of heat conduction plates face each other in an inserted status between the unit batteries, and a space exists between two adjacent plates of the first and second sets of heat conduction plates set at the same level.

2. The battery system as set forth in claim 1, wherein the plurality of unit batteries and the heat conduction plates are stacked substantially vertically, and the at least one heat pipe penetrates the heat conduction plates substantially vertically.

3. The battery system as set forth in claim 1, wherein the at least one heat pipe penetrates the heat conduction plates substantially in a direction of gravity.

4. The battery system as set forth in claim 1, wherein the at least one heat pipe includes a plurality of heat pipes that are spaced apart from each other and arranged substantially in parallel to penetrate the exposed second parts of the heat conduction plates.

5. The battery system as set forth in claim 1, wherein the first set of plates and the second set of plates are inserted into the unit batteries from opposite sides of the unit batteries.

6. The battery system as set forth in claim 1, wherein a length of each of the heat conduction plates is shorter than half of a length of each of the unit batteries.

7. The battery system as set forth in claim 1, wherein the unit batteries and the heat conduction plates are stacked substantially vertically, and the at least one heat pipe penetrates the heat conduction plates substantially vertically.

8. The battery system as set forth in claim 7, wherein the at least one heat pipe comprises:
   a first set of heat pipes penetrating the first set of heat conduction plates and a second set of heat pipes penetrating the second set of heat conduction plates, each set of heat pipes being bent at or above an upper part of the stacked unit batteries in a direction toward a center of the unit batteries, and each end of the first and second sets of bent heat pipes being coupled to a heat radiator.

9. The battery system as set forth in claim 7, wherein the at least one heat pipe comprises:

a first set of heat pipes penetrating the first set of heat conduction plates and a second set of heat pipes penetrating the second set of heat conduction plates, each set of heat pipes extending upwardly over the stacked unit batteries, and each end of the first and second sets of heat pipes being coupled to a heat radiator.

10. A battery system, comprising:
a plurality of unit batteries each having a panel shape and stacked in series with opposing faces of adjacent unit batteries being next to each other;
a plurality of heat conduction plates inserted between the unit batteries in a manner such that a first part of each respective heat conduction plate is inserted between opposing faces of corresponding unit batteries, with upper and lower faces of each respective heat conduction plate being in contact with the opposing faces of the corresponding unit batteries, and that a second part of each respective heat conduction plate is exposed to an outside of the stacked unit batteries;
a heat pipe thermally coupling the plurality of heat conduction plates by successively penetrating the exposed second part of the heat conduction plates at the outside of the unit batteries, with an end of the heat pipe being thermally coupled to a heat radiator after penetrating a last heat conduction plate;
a housing hermetically surrounding the unit batteries, the heat conduction plates and the heat pipe; and
an air duct surrounding the heat radiator,
wherein the plurality of heat conduction plates comprise a first set of plates and a second set of plates, the first and second sets of plates being separated from each other, in which inserted parts of the first set of plates are inserted into the unit batteries from a first side of the unit batteries, and inserted parts of the second set of plates are inserted into the unit batteries from a second side of the unit batteries, and the heat pipe penetrates exposed parts of the first and second sets of plates, and
wherein the first and second sets of heat conduction plates are inserted between the unit batteries at a same level so as to be arranged in a manner such that ends of the first and second sets of heat conduction plates face each other in an inserted status between the unit batteries, and a space exists between two adjacent plates of the first and second sets of heat conduction plates set at the same level.

11. A battery system, comprising:
a plurality of unit batteries each having a panel shape and stacked in series with opposing faces of adjacent unit batteries being next to each other;
a plurality of heat conduction plates each having a panel shape and made of a conductive material, and inserted between the unit batteries in a manner such that first parts of the heat conduction plates are inserted between the opposing faces of the unit batteries, with upper and lower faces of the heat conduction plates being in contact with the opposing faces of the unit batteries, and that second parts of the heat conduction plates are exposed to an outside of the stacked unit batteries;
a heat pipe thermally coupling the plurality of heat conduction plates by successively penetrating the exposed second parts of the heat conduction plates at the outside of the unit batteries, with an end of the heat pipe being thermally coupled to a heat radiator after penetrating a last heat conduction plate; and
an air duct surrounding the heat radiator,
wherein the plurality of heat conduction plates comprise a first set of plates and a second set of plates, the first and second sets of plates being separated from each other, in which inserted parts of the first set of plates are inserted into the unit batteries from a first side of the unit batteries, and inserted parts of the second set of plates are inserted into the unit batteries from a second side of the unit batteries, and the heat pipe penetrates exposed parts of the first and second sets of plates, and
wherein the first and second sets of heat conduction plates are inserted between the unit batteries at a same level so as to be arranged in a manner such that ends of the first and second sets of heat conduction plates face each other in an inserted status between the unit batteries, and a space exists between two adjacent plates of the first and second sets of heat conduction plates set at the same level.

12. The battery system as set forth in claim 11, wherein the end of the heat pipe is inserted into the air duct after penetrating the last heat conduction plate so as to be coupled to the heat radiator inside the air duct.

13. A temperature controlling unit of a battery system, the temperature controlling unit comprising:
a plurality of heat conduction plates each having a panel shape and made of conductive material, and inserted between a plurality of unit batteries in a manner such that first parts of the heat conduction plates are inserted between opposing faces of the stacked unit batteries, with upper and lower faces of each respective heat conduction plate being in contact with the opposing faces of corresponding adjacent unit batteries, and that second parts of the heat conduction plates are exposed to an outside of the unit batteries; and
a heat pipe thermally coupling the plurality of heat conduction plates by successively penetrating the exposed second parts of the heat conduction plates at the outside of the unit batteries, with an end of the heat pipe being thermally coupled to a heat radiator after penetrating a last heat conduction plate,
wherein the plurality of heat conduction plates comprise a first set of plates and a second set of plates, the first and second sets of plates being separated from each other, in which inserted parts of the first set of plates are inserted into the unit batteries from a first side of the unit batteries, and inserted parts of the second set of plates are inserted into the unit batteries from a second side of the unit batteries, and the heat pipe penetrates exposed parts of the first and second sets of plates, and
wherein the first and second sets of heat conduction plates are inserted between the unit batteries at a same level so as to be arranged in a manner such that ends of the first and second sets of heat conduction plates face each other in an inserted status between the unit batteries, and a space exists between two adjacent plates of the first and second sets of heat conduction plates set at the same level.

14. The temperature controlling unit of a battery system as set forth in claim 13, wherein the plurality of heat conduction plates is arranged substantially in parallel and is spaced apart from each other by a thickness of each of the unit batteries.

* * * * *